No. 728,063. PATENTED MAY 12, 1903.
R. WILSON.
TRANSPARENT MIRROR.
APPLICATION FILED SEPT. 8, 1902.
NO MODEL.
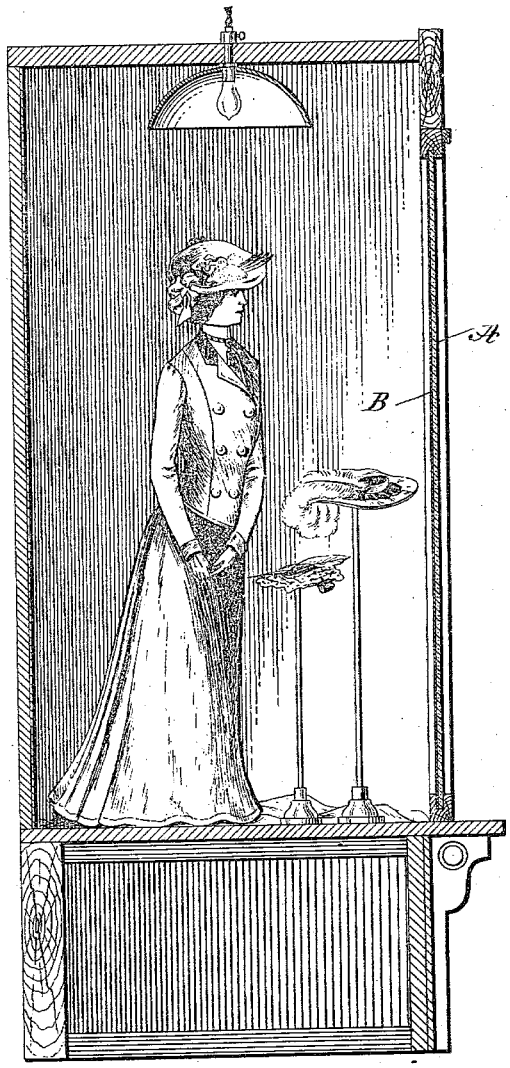
WITNESSES:
INVENTOR
Richard Wilson
BY
ATTORNEYS.

No. 728,063. Patented May 12, 1903.

UNITED STATES PATENT OFFICE.

RICHARD WILSON, OF NEW YORK, N. Y.

TRANSPARENT MIRROR.

SPECIFICATION forming part of Letters Patent No. 728,063, dated May 12, 1903.

Application filed September 8, 1902. Serial No. 122,543. (No model.)

*To all whom it may concern:*

Be it known that I, RICHARD WILSON, a citizen of the United States, and a resident of the city of New York, borough of Manhattan, in the county and State of New York, have invented a new and Improved Transparent Mirror, of which the following is a full, clear, and exact description.

The object of the invention is to provide a new and improved transparent mirror arranged to reflect images and to allow of seeing through it according to the amount of light in the background—that is, when the background is darkened the transparent mirror reflects images in front of it, and when the background is lighted the mirror becomes transparent.

The invention consists of novel features and parts and combinations of the same, as will be more fully described hereinafter and then pointed out in the claims.

Reference is to be had to the accompanying drawing, forming a part of this specification, in which the figure is a transverse section of the improvement as arranged in a show-window.

The transparent mirror consists, essentially, of a transparent or translucent sheet or plate A of glass or similar transparent or translucent material and a transparent and reflecting coating B on the back of the sheet or plate A, the coating being capable of reflecting the image of an object in front of the device on providing the latter with a dark background or allowing a person to see through the plate and coating on a lighted background.

It is understood that the coating B is capable of rendering the plate reflective, and at the same time the coating B is non-opaque or transparent or translucent, and as the plate A has a similar property it is evident that a person can see through the plate and the coating in case an illuminated background is provided.

The coating B consists of a silvering such as is usually employed for making ordinary mirrors, and this silvering is applied to the sheet or plate and then a second subsequent coating is applied to the first coating, and this second coating consists of amyl acetate, ten ounces; dissolved guncotton, one hundred grams; fusel-oil, five ounces.

The ingredients of the second coating are thoroughly mixed before application and are thinned, if necessary, by the use of alcohol, and this second coating is applied on the silvering by a brush or is otherwise evenly spread over the silvering. After this is done the second coating is left on the silvering or first coating for, say, about ten minutes under ordinary temperature. The second coating causes a chemical reaction with the silvering or first coating, so as to change the silvering from a bluish opaque hue to transparency of about ordinary glass when held to the light. When the device is arranged in front of a dark background, then the coating has a reflecting property, thus forming of the plate and coating a mirror.

The device may be used for various purposes—such as illusive stage effects, in show-windows, as advertising mediums, and in show-cases, as, for instance, shown in the drawing—it being understood that in show-windows the front plate is formed of a transparent mirror, as described, and the sides and back of the show-window are arranged to be light-tight, and in the show-window is arranged an illuminating device to illuminate the background, and thereby allow a person standing in front of the show-window to view the goods through the transparent mirror in the usual manner; but when the illuminating device is extinguished and the show-window background becomes dark then the transparent mirror acts as a mirror only and reflects the image of the person in front of the show-window without allowing the person to see the goods displayed in the show-window.

Having thus described my invention, I claim as new and desire to secure by Letters Patent—

1. As a new article of manufacture, a mirror having the ordinary silvered surface, and a coating over said silvering, rendering the same transparent without destroying its reflective properties, as specified and for the purpose set forth.

2. As a new article of manufacture, a transparent mirror consisting of a transparent or translucent plate, and a coating on the back of the plate, capable of rendering the plate reflective, the coating being transparent or translucent and consisting of a silvering material, amyl acetate, guncotton and fusel-oil, as set forth.

3. The herein-described composition for rendering the mirror-silvering material transparent and reflective, consisting of amyl acetate, guncotton and fusel-oil, as set forth.

In testimony whereof I have signed my name to this specification in the presence of two subscribing witnesses.

RICHARD WILSON.

Witnesses:
 THEO. G. HOSTER,
 EVERARD BOLTON MARSHALL.